United States Patent [19]

Wilson et al.

[11] Patent Number: 5,571,767
[45] Date of Patent: Nov. 5, 1996

[54] LOW FIRE X7R DIELECTRIC COMPOSITIONS AND CAPACITORS MADE THEREFROM

[75] Inventors: James M. Wilson, Victor; Walter J. Symes, Jr., Dundee, both of N.Y.

[73] Assignee: Ferro Corporation, Cleveland, Ohio

[21] Appl. No.: 517,737

[22] Filed: Aug. 21, 1995

[51] Int. Cl.⁶ ................................................ C04B 35/46
[52] U.S. Cl. ............................ 501/139; 501/32; 501/138
[58] Field of Search ................................... 501/138, 139; 361/321.1, 321.5

[56] References Cited

U.S. PATENT DOCUMENTS

| | | | |
|---|---|---|---|
| 4,047,903 | 9/1977 | Hesse et al. | 51/298 |
| 4,379,319 | 4/1983 | Wilson | 361/321 |
| 4,394,456 | 7/1983 | Sakabe et al. | 501/138 |
| 4,457,766 | 7/1984 | Caul | 51/298 |
| 4,540,676 | 9/1985 | Chu et al. | 501/138 |
| 4,547,204 | 10/1985 | Caul | 51/298 |
| 4,588,419 | 5/1986 | Caul et al. | 51/295 |
| 4,670,243 | 6/1987 | Wilson et al. | 423/598 |
| 4,816,430 | 3/1989 | Chu | 501/137 |
| 4,903,440 | 2/1990 | Larson et al. | 51/298 |
| 4,927,431 | 5/1990 | Buchanan et al. | 51/298 |
| 5,055,113 | 10/1991 | Larson et al. | 51/298 |
| 5,128,289 | 7/1992 | Wilson | 501/137 |
| 5,292,694 | 3/1994 | Abe et al. | 501/139 |
| 5,296,426 | 3/1994 | Burn | 501/139 |
| 5,310,710 | 5/1994 | Takase et al. | 501/139 |
| 5,350,721 | 9/1994 | Abe et al. | 501/139 |

FOREIGN PATENT DOCUMENTS

| | | | |
|---|---|---|---|
| 0086103 | 5/1984 | Japan | 501/139 |
| 402049307 | 2/1990 | Japan | 501/139 |

*Primary Examiner*—Deborah Jones
*Attorney, Agent, or Firm*—Shlesinger, Fitzsimmons & Shlesinger

[57] ABSTRACT

Multi-layer ceramic capacitors are made from novel low temperature fired ceramic dielectric compositions which may have dielectric constants of over 3200 at room temperature, and which do not vary in value by more than 15 percent over a temperature range of −55° C. to +125° C., with the value at +25° C. being the reference point. The compositions comprise a base ceramic formulation or host material, a ceramic sintering aid, and a low melting point glass formulation, each derived from metal oxides or precursors thereof. The host material is made from 97.89 to 98.19 weight percent barium titanate and from about 1.81 to 2.11 weight percent neodymium oxide, the sintering aid from $Bi_2O_3 \cdot 2TiO_2$, and the the glass formulation from 86.0 wt. % PbO, 9.0 wt. % $B_2O_3$, 1.58 wt. % $SiO_2$, 0.13 wt. % $TiO_2$ and 3.29 wt. % $Al_2O_3$. Manganese dioxide or a precursor is added in an amount of about 0.205 wt. % as the dioxide based on the combined weight of the ceramic formulation, the $Bi_2O_3 \cdot 2TiO_2$ and the glass formulation. The mixture, when made into a multi-layer capacitor is fired at or below 1100° C.

9 Claims, No Drawings

LOW FIRE X7R DIELECTRIC COMPOSITIONS AND CAPACITORS MADE THEREFROM

BACKGROUND OF THE INVENTION

This invention relates to ceramic dielectric compositions and to multi-layer ceramic capacitors made therefrom, and more particularly this invention relates to improved dielectric ceramic compositions of the X7R variety, particularly suitable for producing low fire multi-layer ceramic capacitors which may have dielectric constants in excess of 3200.

There are a great number of prior U.S. patents which disclose various ceramic dielectric compositions that exhibit X7R characteristics—namely, compositions which meet the U.S. Electronics Industries Association (EIA) standard requiring a temperature coefficient of dielectric constant (K') that varies no more than about +15% from the reference value at 25° C. over a temperature range of −55° C. to 125° C. Much of this wealth of prior art can be attributed to the fact that even small changes in the constituents and/or ratio of the constituents in dielectric compositions may generate new and unexpected characteristics. These new characteristics may produce enhanced properties when used in a multilayer ceramic capacitor.

For example, U.S. Pat. No. 4,816,430 discloses a composition having X7R characteristics, but it is necessary to fire products produced from such compositions at relatively high temperatures—namely, temperatures in excess of 1280° C. As a consequence capacitors made from those compositions must utilize expensive electrode materials, such as for example pure palladium. My prior U.S. Pat. No. 5,128,289 also discloses dielectric ceramic materials having X7R characteristics, but they also constitute high fire compositions which must be sintered at temperatures which also must be in excess of 1280° C. The last-mentioned compositions, however, have the advantage that they produce products having very dense, fine grained ceramic microstructures, thus permitting the use of much thinner dielectric layers during the production of multi-layer capacitors. Such capacitors in turn exhibit higher dielectric constants (K'), and thus permit the use of less expensive electrode materials for a given capacitance value.

The U.S. Pat. No. 4,540,676 and 5,296,426 disclose so-called low fire dielectric compositions having X7R characteristics, but although it is possible to fire capacitors made from such compositions in the range of 1100° to 1150° C., such capacitors do not necessarily exhibit dielectric constant values in excess of 3200.

It is an object of this invention, therefore, to produce dielectric ceramic compositions which exhibit X7R characterics, and which can be used to produce capacitors that are capable of developing dielectric constants (K') in excess of 3200.

Another object of this invention is to provide an improved X7R ceramic dielectric composition of the type described for producing a low fire (equal to or less than 1100° C.) capacitor having a very high dielectric constant, low dissipation factor, and good temperature stability.

Still another object of this invention is to provide compositions of the type described which will produce multi-layer ceramic capacitors capable of generating dissipation factors which are equal to or less than 2.5% at 1KHz test frequency with a signal amplitude of 1.0 VRMS.

Other objects of the invention will be apparent hereinafter from the specification and from the recital of the appended claims.

SUMMARY OF THE INVENTION

The system comprising a mixture of high purity barium titanate of uniform grain size and neodymium oxide are milled together in an aqueous slurry, dried and reacted at an elevated temperature. This reacted powder is then reduced in particle size by mechanical pulverization after which $Bi_2O_3$ $2TiO_2$ and a powdered, low melting point glass are added which are milled together in an aqueous slurry, dried and pulverized to form a finely divided, homogeneous powder. The powder is then mixed with a solvent based PVB binder and cast into sheets which are then screen printed with electrode material and laminated to form multi-layer ceramic capacitors. Such capacitors have exhibited dielectric constants of 3500.

PREFERRED EMBODIMENTS OF THE INVENTION

The novel ceramic dielectric compositions disclosed herein may be formulated from a host material comprising mixtures of high purity, uniform particle size $BaTiO_3$ and $Nd_2O_3$. The $BaTiO_3$ used in the samples referred to hereinafter was calcined independently of the $Nd_2O_3$, and after being combined with $Nd_2O_3$ the mixture was calcined and then mixed with finely powdered $Bi_2O_3.2TiO_2$ and finely powdered low melting point glass. For the above-noted mixture the high purity barium titanate was of the type which is sold by the Transelco, Division of Ferro Corporation as product code 219-9, and which is produced via a precipitation process similar in nature to that taught for example in my U.S. Pat. No. 4,670,243.

For example, each host material of the sample dielectric compositions listed in the following tables was milled in an aqueous slurry in a vibratory type sweco mill, using $ZrO_2$ grinding media, for 1.5 hours. This slurry was dried and the dried slurry was passed through a 10 mesh screen prior to calcining. This calcined material was then pulverized to a fine powder and mixed with $Bi_2O_3.TiO_2$, glass powder and $Mn(NO_3)_2$, in the form of a 50% aqueous solution, at the listed percentages. The resulting compositions were milled in an aqueous slurry in a rolling ball mill with $Al_2O_3$ grinding media for four hours, dried and pulverized to a finely divided homogenous dielectric powder.

The dielectric powders were then mixed with a commercially available solvent based PVB binder system to prepare a slip for tape casting. The resultant slip was cast into sheets, cut to size and printed with a 70% Ag 30% Pd internal electrode paste. These sheets were then stacked, laminated and cut into individual multi-layer ceramic capacitors having a conventional configuration, such as illustrated for example in FIG. 2 in my U.S. Pat. No. 4,379,319, the contents of which is incorporated herein by way of reference. Said capacitors were then fired over a range of temperatures from 1070° to 1100° C. The fired capacitors were silver terminated with the terminations being fired on at 750° C. for fifteen minutes, and were tested to determine certain electrical properties thereof as noted hereinafter.

The following chart lists the compositions of four different host materials which were used in producing certain of the sample dielectric compositions referred to hereinafter.

| Host Material | wt % $Nd_2O_3$ | wt % $BaTiO_3$ | mole % $Nd_2O_3$ | mole % $BaTiO_3$ |
|---|---|---|---|---|
| No. 1 | 1.81 | 98.19 | 1.262 | 98.738 |
| No. 2 | 1.91 | 98.09 | 1.332 | 98.668 |
| No. 3 | 2.01 | 97.99 | 1.402 | 98.598 |
| No. 4 | 2.11 | 97.89 | 1.472 | 98.528 |

Each of the above host mixtures was calcined in a laboratory box Kiln at 1350° C. for three hours. Four different low firing dielectric compositions 1A, 2A, 3A and 4A were then formulated from these hosts No. 1, No. 2, No. 3 and No.4, respectively, using the following formula.

| SAMPLE COMPOSITION FORMULA | |
|---|---|
| COMPONENT | wt. % |
| Host Material | 91.013 |
| $Bi_2O_3.2TiO_2$ | 7.983 |
| glass powder | 0.799 |
| $Mn(NO_3)_2$ at 50% | 0.205 |

Electrical properties of multiplayer capacitors made from samples 1A–4A are listed hereinafter in Table I.

TABLE I

| Electrical properties | | | | |
|---|---|---|---|---|
| Material | 1A | | 2A | |
| Firing temp. | 1080 | 1100 | 1080 | 1100 |
| diel. thk. mils | 0.77 | 0.77 | 0.91 | 1.09 |
| diel. K' | 2850 | 2842 | 2962 | 2987 |
| % DF | 2.26 | 2.27 | 2.09 | 2.07 |
| −55° % Δ | −14 | −12 | −7 | −11 |
| 85° % Δ | −4 | −2 | −3 | −1 |
| 125° % Δ | −1 | −1 | +2 | +9 |
| 25° R · C | >10k | >10k | >10k | >10k |
| 125° R · C | 704 | 1500 | 3530 | 3283 |
| Material | 3A | | 4A | |
| Firing temp. | 1080 | 1100 | 1080 | 1100 |
| diel. thk. mils | 0.80 | 0.86 | 0.82 | 0.82 |
| diel. K' | 2675 | 2740 | 2805 | 2812 |
| % DF | 2.14 | 2.18 | 1.99 | 2.03 |
| −55° % Δ | −10 | −10 | −7 | −9 |
| 85° % Δ | −5 | −2 | −6 | −3 |
| 125° % Δ | −2 | 0 | −5 | 0 |
| 25° R · C | >10k | >10k | >10K | >10K |
| 125° R · C | 749 | 415 | 3550 | 2927 |

Referring to the results listed in Table I, it can be seen that all four sample compositions meet the E.I.A. specification for X7R type dielectrics; and that sample composition 2A, which is made from the No. 2 host material, exhibits the highest dielectric constant. Therefore, to determine if the calcining temperature of the $BaTiO_3$, prior to its being combined with $Nd_2O_3$, could have any significant effect on the sample compositions, samples of the $BaTiO_3$ powder were calcined at respectively different temperatures before being mixed with $Nd_2O_3$ in the proportions corresponding to the above-noted host No. 2. The precalcined $BaTiO_3$ and $Nd_2O_3$ were then mixed, calcined, and mixed per the foregoing sample formulation with the other components for forming the additional sample compositions referred to hereinafter as samples 5A, 6A, 7A, 8A and 9A. Specifically, samples 5A, 6A, 7A, 8A and 9A were produced using host material No. 2 in which the $BaTiO_3$ was precalcined at 900° C., 1000° C., 1100° C., 1200° C. and 1225° C., respectively. (A sample using $BaTiO_3$ calcined at 1177° C. was also tested but has already been reported on as sample 2A.) The electrical properties of samples 5A –9A are listed in the following Table II.

TABLE II

| Electrical Properties | | | | | | |
|---|---|---|---|---|---|---|
| Material | 5A | | 6A | | 7A | |
| Firing Temp C. | 1080 | 1100 | 1080 | 1100 | 1080 | 1100 |
| diel. thk. mils | 0.92 | 0.94 | 1.06 | 1.02 | 0.93 | 0.94 |
| diel. const. | 2481 | 2537 | 2437 | 2507 | 2858 | 3110 |
| % DF | 1.92 | 1.53 | 1.73 | 1.51 | 1.90 | 2.00 |
| −55° % Δ | −20 | −17 | −20 | −16 | −9 | −10 |
| 85° % Δ | −8 | −6 | −8 | −4 | −6 | −4 |
| 125° % Δ | −18 | −13 | −16 | −9 | −6 | −1 |
| 25° R · C | 1504 | 1229 | 467 | 658 | >10K | >10K |
| 125° R · C | 1457 | 1152 | 2188 | 1489 | 300 | 360 |
| Material | 8A | | 9A | | | |
| Firing Temp C. | 1080 | 1100 | 1080 | 1100 | | |
| diel. thk. mils | 0.94 | 1.01 | 0.94 | 1.02 | | |
| diel. const. | 2794 | 2889 | 2939 | 2932 | | |
| % DF | 1.05 | 2.02 | 2.11 | 2.10 | | |
| −55° % Δ | −9 | −10 | −9 | −10 | | |
| 85° % Δ | −4 | −2 | −4 | −1 | | |
| 125° % Δ | +4 | +3 | +5 | −3 | | |
| 25° R · C | >10K | >10K | >10K | >10K | | |
| 125° R · C | 2600 | 2100 | 3600 | 2450 | | |

Referring to the results listed in Table II, it can be seen that when the $BaTiO_3$ is calcined at equal to or less than 1000° C. the dielectric formulation generated does not meet E.I.A. X7R specifications. Comparing the remaining three calcines, it can be seen that composition 7A develops the highest dielectric constant at 1100° C., but composition 2A (Table I) generates nearly as high a dielectric constant along with a tighter T.C.C. as well as a much higher R C product at 125° C.

For another series of tests relating to calcining temperatures, five samples of the host material No. 2, each of which included $BaTiO_3$ particles precalcined at 1177° C., were employed in tests. The first sample host material was not calcined, and the remaining four samples were calcined at temperatures of 1200° C., 1250° C., 1300° C. and 1365° C., respectively. The five samples were then mixed per the above sample composition formula with the remaining components to produce the compositions referred to hereinafter as samples 10A, 11A, 12A, 13A and 14A, respectively. (A sample using host No. 2 calcined at 1350° C. has already been reported on as sample 2A.) The electrical properties of samples 10A–14A are listed in the following Table III.

TABLE III

| Electrical Properties | | | | | | |
|---|---|---|---|---|---|---|
| Material | 10A | | 11A | | 12A | |
| Firing Temp. °C. | 1080 | 1100 | 1080 | 1100 | 1080 | 1100 |
| diel. thk. mils. | 1.00 | 0.99 | 0.90 | 0.92 | 0.88 | 0.89 |
| diel. constant | 2180 | 2188 | 2575 | 2598 | 2541 | 2539 |
| % DF | 1.92 | 1.871 | 2.12 | 2.15 | 2.22 | 2.22 |
| −55° % Δ | −17 | −14 | −14 | −13 | −15 | −14 |
| 85° % Δ | +1 | +2 | 0 | +1 | +1 | +2 |
| 125° % Δ | +7 | +10 | +8 | +11 | +10 | +2 |
| 25° R · C | >10K | >10K | >10K | >10K | >10K | >10K |
| 125° R · C | 9000 | 6000 | 5000 | 2700 | 4000 | 2500 |
| Material | 13A | | 14A | | | |

TABLE III-continued

Electrical Properties

| Firing Temp. °C. | 1080 | 1100 | 1080 | 1100 |
|---|---|---|---|---|
| diel. thk. mils | 0.92 | 0.96 | 1.01 | 0.93 |
| diel. constant | 2539 | 2608 | 3500 | 3430 |
| % DF | 2.08 | 2.17 | 1.93 | 1.98 |
| −55° % Δ | −15 | −14 | −6 | −8 |
| 85° % Δ | −2 | 0 | −6 | −5 |
| 125° % Δ | +2 | +6 | −7 | −2 |
| 25° R · C | >10K | >10K | >10K | >10K |
| 125° R · C | 2500 | 1800 | 820 | 1290 |

It can be seen from Table III that increasing the temperature at which the host is calcined generates a corresponding increase in dielectric constant. Although increasing the calcining temperature of the host material may increase the dielectric constant even more, the drop in insulation resistance at 1365° C. indicates there may be continued loss at higher temperatures. Any further increase in temperature would also necessitate the use of more expensive, higher temperature capacity calcining saggers.

Tests were also conducted on three sample compositions 15A, 16A and 17A in each of which, except for sample 17A, the ratio of the host material No. 2 to the $Bi_2O_3 \cdot 2TiO_2$ differed from the proportions (wt. %) listed in the foregoing sample composition formula. The proportions of these components, except for the glass powder and the $Mn(NO_3)_2$ which remain in the same proportions, are listed in the following chart, and the electrical properties thereof are listed in Table IV.

| Sample | wt % Host | wt % $Bi_2O_3.2TiO_2$ |
|---|---|---|
| 15A | 89.013 | 9.983 |
| 16A | 90.013 | 8.983 |
| 17A | 91.013 | 7.983 |

TABLE IV

Electrical Properties

| Material | 15A | | 16A | | 17A | |
|---|---|---|---|---|---|---|
| Firing Temp. °C. | 1080 | 1100 | 1080 | 1100 | 1080 | 1100 |
| diel. thk. mils | 0.85 | 0.88 | 0.92 | 0.95 | 0.82 | 0.84 |
| diel. constant | 3068 | 3333 | 2968 | 3176 | 3179 | 3328 |
| % DF | 1.70 | 1.66 | 1.82 | 2.03 | 1.98 | 2.17 |
| −55° % Δ | −5 | −6 | −7 | −8 | −7 | −8 |
| 85° % Δ | −8 | −10 | −8 | −10 | −8 | −10 |
| 125° % Δ | −6 | −11 | −5 | −10 | −6 | −10 |
| 25° R · C | >10K | >10K | >10K | >10K | >10K | >10K |
| 125° R · C | 1011 | 152 | 2366 | 411 | 2124 | 318 |

The previously listed data illustrates a relationship between the level of $Bi_2O_3 \cdot 2TiO_3$ present in the low fire and the % d.f. of the resultant multi-layer ceramic capacitor. Increasing the amount of $Bi_2O_3 \cdot 2TiO_2$ improves the d.f. value which will in turn make the material more useful for thinner dielectric layer capacitors. This is due to the fact that present E.I.A. specifications state that X7R type dielectrics be electrically evaluated using a 1VRMS signal. If the test signal is kept at a constant amplitude the d.f. value of a given material will increase as dielectric thickness decreases. In contrast to this as the dielectric thickness of a capacitor decreases the capacitance of said capacitor increases. Present and future trends towards miniaturization dictate the need for dielectric materials which are able to produce d.f. values of equal to or less than 2.5% @ approximately 10um dielectric thickness.

In addition to the previously reported sample composition 15A, the glass powder levels of two additional samples 18A and 19A were altered from the amounts listed in the first-noted sample formulation, as shown by the proportions listed in the following chart. Samples 18A and 19A, made with the host material No. 2, exhibited the electrical characteristics listed in Table V.

| Material | wt % Glass | wt % Host | wt % $Bi_2O_3.2TiO_2$ | wt % $Mn(NO_3)_2$ |
|---|---|---|---|---|
| 18A | 1.199 | 88.813 | 9.783 | 0.205 |
| 19A | 1.599 | 88.613 | 9.583 | 0.205 |

TABLE V

Electrical Properties

| Material | 18A | | 19A | |
|---|---|---|---|---|
| Firing Temp. °C. | 1080 | 1100 | 1080 | 1100 |
| diel. thk. mils | 0.71 | 0.74 | 0.88 | 0.83 |
| diel. constant | 3219 | 3311 | 2979 | 3218 |
| % DF | 1.82 | 1.89 | 1.66 | 1.70 |
| −55° % Δ | −7 | −8 | −8 | −9 |
| 85° % Δ | −8 | −10 | −8 | −10 |
| 125° % Δ | −7 | −12 | −7 | −11 |
| 25° R · C | >10K | >10K | >10K | >10K |
| 125° R · C | 2871 | 280 | 4825 | 495 |

Noting the results as listed in Table V it can be seen that by increasing the level of glass present in the composition there is a corresponding increase in the R.C product at 125° C. This measurement is of great value to capacitor manufacturers with higher values generally indicating a more robust material less likely to suffer sudden catastrophic breakdown.

Finally, the following chart lists sample compositions 20A–24A which are made with host No. 2, and have respectively different levels of the 50% aqueous solution of $Mn(NO_3)2$ referred to in the first-noted sample formulation. Also, Table VI reflects the electrical characteristics of these samples 20A–24A.

| Material | wt % $Mn(NO_3)_2$ | wt % Host | wt % $Bi_2O_3.2TiO_2$ | wt % glass pdr |
|---|---|---|---|---|
| 20A | 0.00 | 89.196 | 10.004 | 0.800 |
| 21A | 0.05 | 89.151 | 9.998 | 0.800 |
| 22A | 0.100 | 89.107 | 9.993 | 0.800 |
| 23A | 0.205 | 89.013 | 9.983 | 0.799 |
| 24A | 0.305 | 88.924 | 9.973 | 0.798 |

TABLE VI

Electrical Properties

| Material | 20A | | 21A | | 22A | |
|---|---|---|---|---|---|---|
| Firing Temp. °C. | 1080 | 1100 | 1080 | 1100 | 1080 | 1100 |
| diel. thk. mils | 0.80 | 0.82 | 0.87 | 0.84 | 0.77 | 0.81 |
| diel. constant | 2949 | 3140 | 3259 | 3100 | 3096 | 3030 |
| % DF | 1.59 | 1.50 | 1.63 | 1.86 | 1.78 | 2.20 |
| −55° % Δ | −9 | −8 | 08 | −10 | −10 | −17 |
| 85° % Δ | −10 | −11 | −10 | −11 | −9 | −10 |
| 125° % Δ | −12 | −16 | −11 | −16 | −11 | −15 |
| 25° R · C | >10K | >10K | >10K | >10K | >10K | >10K |

TABLE VI-continued

| Electrical Properties | | | | | | |
|---|---|---|---|---|---|---|
| 125° R · C | 1 | 1 | 20 | 14 | 127 | 1261 |

| Material | 23A | | 24A | |
|---|---|---|---|---|
| Firing Temp. °C. | 1080 | 1100 | 1080 | 1100 |
| diel. thk. mils | 0.85 | 0.86 | 0.84 | 0.84 |
| diel. constant | 2890 | 2863 | 3177 | 3096 |
| % DF | 1.58 | 1.54 | 1.44 | 1.38 |
| −55° % Δ | −12 | −10 | −8 | −6 |
| 85° % Δ | −8 | −10 | −9 | −12 |
| 125° % Δ | −11 | −14 | −13 | −16 |
| 25° R · C | >10K | >10K | >10K | >10K |
| 125° R · C | 581 | 622 | 1967 | 267 |

From the foregoing it will be apparent that the present invention provides novel ceramic dielectric compositions which are particularly suitable for use in the production of multi-layer capacitors of the low fire variety, which are adapted to be fired at or below approximately 1100° C. Because the capacitors can be fired at such low temperatures, it is possible, as noted above, to utilize therefor substantially more inexpensive electrode materials, as compared for example with high fired varieties. The ability to fire the capacitors at relatively low temperatures results from the use of a special barium titanate host material mixed with a ceramic sintering aid produced from bismuth and titanium oxides or precursors thereof, a small amount of glass powder and a trace of manganese dioxide, or a precursor thereof. The host material, which comprises a mixture of barium titanate and neodymium oxide, when used in a formulation including the above-noted sintering aid, glass powder and manganese dioxide, results in suitable X7R formulations when the weight percent of the barium titanate in the host material is in the range of 97.89 to 98.19, and the neodymium oxide weight percent is in the range of 1.81 to 2.11. A typical formulation for producing such dielectric ceramic compositions comprises, in weight percent, the host material in an amount of 91.013, the sintering aid in the form of $Bi_2O_3 2TiO_2$ in an amount of 7.983, glass powder in the amount of 0.799 and the manganese dioxide in the amount of 0.205. (In practice the glass powder itself may comprise 86.0 wt. % of PbO, 9.0 wt. % $B_2O_3$, 1.58 wt. % $SiO_2$, 0.13 wt. % $TiO_2$ and 3.29 wt. % $Al_2O_3$.

From the foregoing it will be noted also that the barium titanate, which is used in the host material, should be precalcined at temperatures at least equal to or greater than 1000° C., or otherwise the formulated sample dielectric compositions will not meet the X7R specifications. Notably also, while although the sample dielectric compositions produced by the above-noted formulation can be produced with dielectric constants in excess of 2700, nevertheless dielectric compositions having dielectric constants in excess of 3000, can be achieved by effecting only slight adjustments in the calcining temperatures for the host material, or by making slight variations in the amount of the $Bi_2O_3 2TiO_2$ employed in the formulation with the host material. Similar such changes in the dielectric constant can be achieved by slight changes in the amount of the glass powder used in the formulation, and to a lesser extent by changes in the amount of manganese dioxide employed in the formulation.

Finally, it will be apparent from the foregoing that extremely reliable and more inexpensive, low fire multi-layer capacitors can be produced by utilizing the novel X7R dielectric compositions disclosed herein.

While this invention has been illustrated and described in detail in connection with only certain embodiments thereof, it will be apparent that it is capable of still further modification, and that this application is intended to cover any such modifications as may fall within the scope of one skilled in the art, or the appended claims.

We claim:

1. A low fire ceramic dielectric composition in powder form capable of producing a multi-layer capacitor having a dielectric constant which does not vary more than about 15% from its value at 25° C. over a temperature range of −55° C. to 125° C., and consisting essentially of a barium titanate and neodymium oxide mixture forming a host material present in the range of approximately 88.6 to 91 wt. % of the composition, a $Bi_2O \cdot 2TiO_2$ sintering aid present in the range of approximately 7.98 to 10.0 wt. % of the composition, a glass powder present in the range of approximately 0.8 to 1.6 wt. % of the composition, and a trace amount of manganese dioxide.

2. A low fire ceramic dielectric composition as defined in claim 1, wherein barium titanate is present in the range 97.89 to 98.19 wt. % of the host material, and neodmium oxide is present in the range of 1.81 to 2.11 wt. % of the host material.

3. A low fire ceramic dielectric composition as defined in claim 1, wherein said manganese dioxide is present in the amount of approximately 0.205 wt. % of the composition.

4. A low fire ceramic dielectric composition as defined in claim 1, wherein said barium titanate is calcined at a temperature in the range of 1100° C. to 1225° C.

5. A low fire ceramic dielectric composition as defined in claim 1, wherein said host material is calcined at a temperature in the range of 1200° C. to 1365° C.

6. A low fire ceramic dielectric composition as defined in claim 1, wherein $Bi_2O \cdot 2TiO_2$ is present in the range of 9.983 to 7.983 wt. % of the composition, and the host material is present in the range of 89.013 to 91.013 wt. %.

7. A low fire multi-layer ceramic capacitor made from the composition defined in claim 1.

8. A low fire multi-layer capacitor as defined in claim 7, and having a dielectric constant equal to or greater than 3000.

9. A low fire multi-layer capacitor as defined in claim 8 fired at a temperature equal to or less than 1100° C.

* * * * *